United States Patent [19]

Vukovic

[11] 4,249,639
[45] Feb. 10, 1981

[54] POWER GENERATING APPARATUS

[76] Inventor: Marko Vukovic, 38 Leggatt St., Melton, Victoria, Australia

[21] Appl. No.: 13,389

[22] Filed: Feb. 21, 1979

[30] Foreign Application Priority Data

Feb. 28, 1978 [AU] Australia ............................. PD3543

[51] Int. Cl.³ ............................................. F03G 7/08
[52] U.S. Cl. ...................................... 185/30; 60/506; 60/507; 74/131
[58] Field of Search .................... 185/30; 60/506, 507; 74/131

[56] References Cited

U.S. PATENT DOCUMENTS

| 657,943 | 9/1900 | Kimball | 60/505 |
| 739,538 | 9/1903 | Fredson | 60/507 |
| 899,957 | 9/1908 | Craig | 60/506 |

FOREIGN PATENT DOCUMENTS 516342  12/1920  France ....................................... 60/506

Primary Examiner—Allan D. Herrmann

[57] ABSTRACT

Power generating apparatus comprising a float mounted on a support which is pivotally mounted to a base the support being secured to a beam extending rearwardly of the base to a vertically extending elongated structure carrying a pair of vertically moveable gear racks in guideways. Each rack is engaged by a gear wheel driven by movement of the racks and one-way drive means connects each gear wheel to an output shaft. Driving weights are secured to each rack to drive the racks in opposite directions under the action of gravity forces acting on the weights, the driving motion causing the output shaft to rotate in a given direction. The free end of the beam is connected to a cross-arm vertically moveable on a guide on the elongate structure, the cross-arm having motion transmitting means to raise each of the weights during vertical movement of the cross-arm resulting from movement of the float.

4 Claims, 2 Drawing Figures

4,249,639

POWER GENERATING APPARATUS

BACKGROUND OF THE INVENTION

This invention relates to improvements in power generating apparatus and relates particularly to improvements in apparatus for generating power utilizing wave motion in open bodies of water.

A number of proposals have been made for the utilization of wave and/or tidal power for generation of electrical power. Such prior proposals generally include generating apparatus which utilize float means moveable by the wave motion on an open body of water. The movement of the float means is then translated into electrical energy by appropriate mechanical apparatus arranged to drive power generating apparatus. The present invention is directed to an improved form of apparatus for utilizing the potential energy in water movement, and particularly wave motion, to generate electrical power.

OBJECTS OF THE INVENTION

It is an object of the invention to provide apparatus which is relatively economical to construct and erect and which is able to utilize the wave motion for electrical power generation.

A further object of the present invention is to provide apparatus which is adapted to utilize the motion of wave forms in the sea or other open bodies of water and to translate the potential energy in such wave motion into electrical power.

A still further object of the present invention is to provide apparatus which can utilize wave motion which varies in frequency and amplitude.

SUMMARY OF THE INVENTION

According to the invention there is provided apparatus for generating electrical power utilizing the motion of waves on an open body of water comprising:

(a) an elongate support structure means extending vertically upwards from a base relatively fixed with respect to said body of water, (b) guide means on said support structure means for at least two vertically movable gear racks and a vertically moveable cross-arm engaged with each rack, (c) motion transmitting means on the cross-arm to move a first one of said gear racks during upward movement of the cross-arm and to move a second of said gear racks during downward movement of the cross-arm, (d) at least one gear wheel engaged with each gear rack, each gear wheel drivingly connected to an output shaft through one-way motion transmitting means whereby the motion of each gear rack in one direction only drivingly rotates said output shaft, (e) a first driving mass fixed to said first one of said gear racks to drive the gear rack downward under the action of gravity, (f) a second driving mass secured by cable means passing around pulley means on the support structure means to said second of said gear racks to drive the said second gear rack upwardly under the action of gravitational forces on said second mass, (g) float means on said body of water and horizontally spaced from the support structure means, said float means having a shape and configuration whereby the wave motion causes the float means to move vertically relative to said base, (h) support means for said float means pivotally mounted to a pivot support means fixed relative to said base and between said float and said support structure means, (i) beam means pivotally mounted at one end to said pivot support means and extending towards said support structure means, said beam means being adjustably secured to said support means for movement therewith in the vertical plane, and (j) a connecting arm pivoted at one end to the free end of said beam means and extending generally, upwardly therefrom to said cross-arm, whereby vertical movement of said float means reciprocatingly drives said cross-arm vertically on its associated guide means.

The invention has for its main object to convert the energy in wave motion to a form which is directly usable to generate power. To this end the apparatus of the invention uses the vertical movement of the float to raise the driving masses towards the top of the support structure means. One driving mass is raised during upward movement of the float and the other driving mass is raised during downward movement of the float. The driving masses descend under the action of gravity and drivingly rotate the output shaft through movement of the associated gear racks, gear wheels and one-way motion transmitting means.

A large flywheel is preferably mounted on or connected to the output shaft, and a generator of appropriate power output is driven by suitable drive-belts or gearing from the output shaft.

The invention will be more clearly understood from the following description of one embodiment of the apparatus taken in conjunction with the accompanying drawings.

DESCRIPTION OF THE PREFERRED EMBODIMENT

Figure 1:
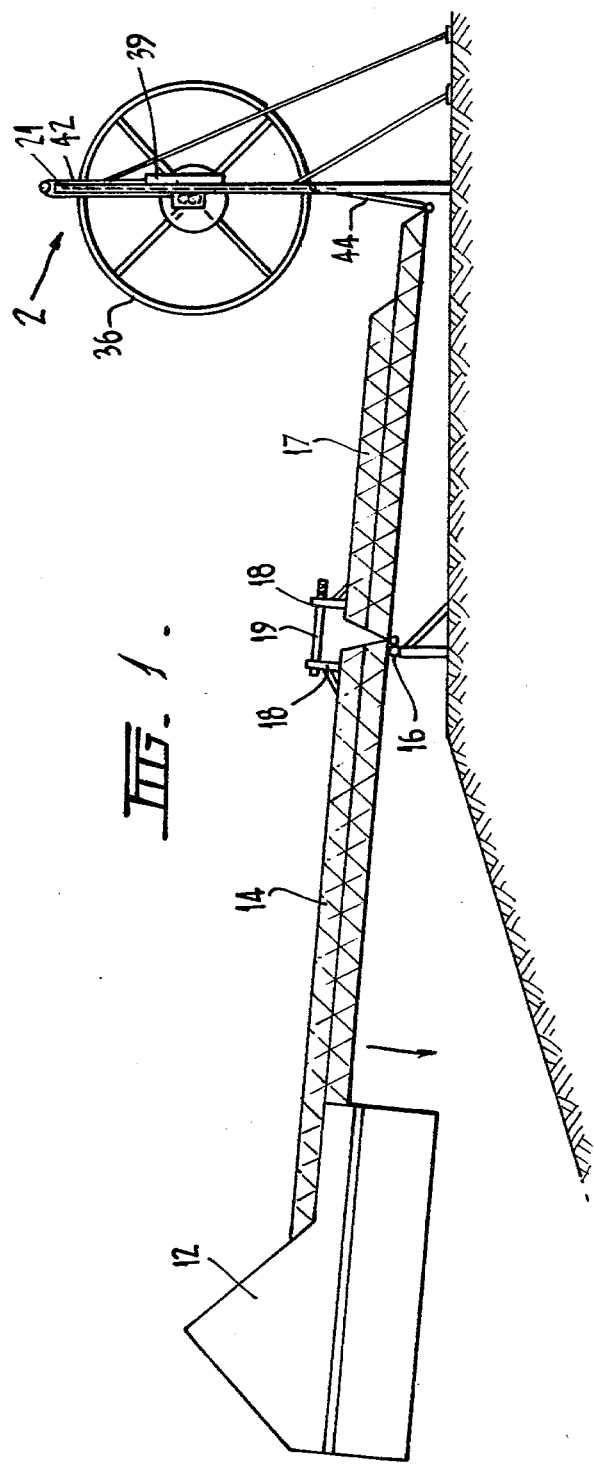
FIG. 1 is a side elevational view of one embodiment of the power generating apparatus
Figure 2:
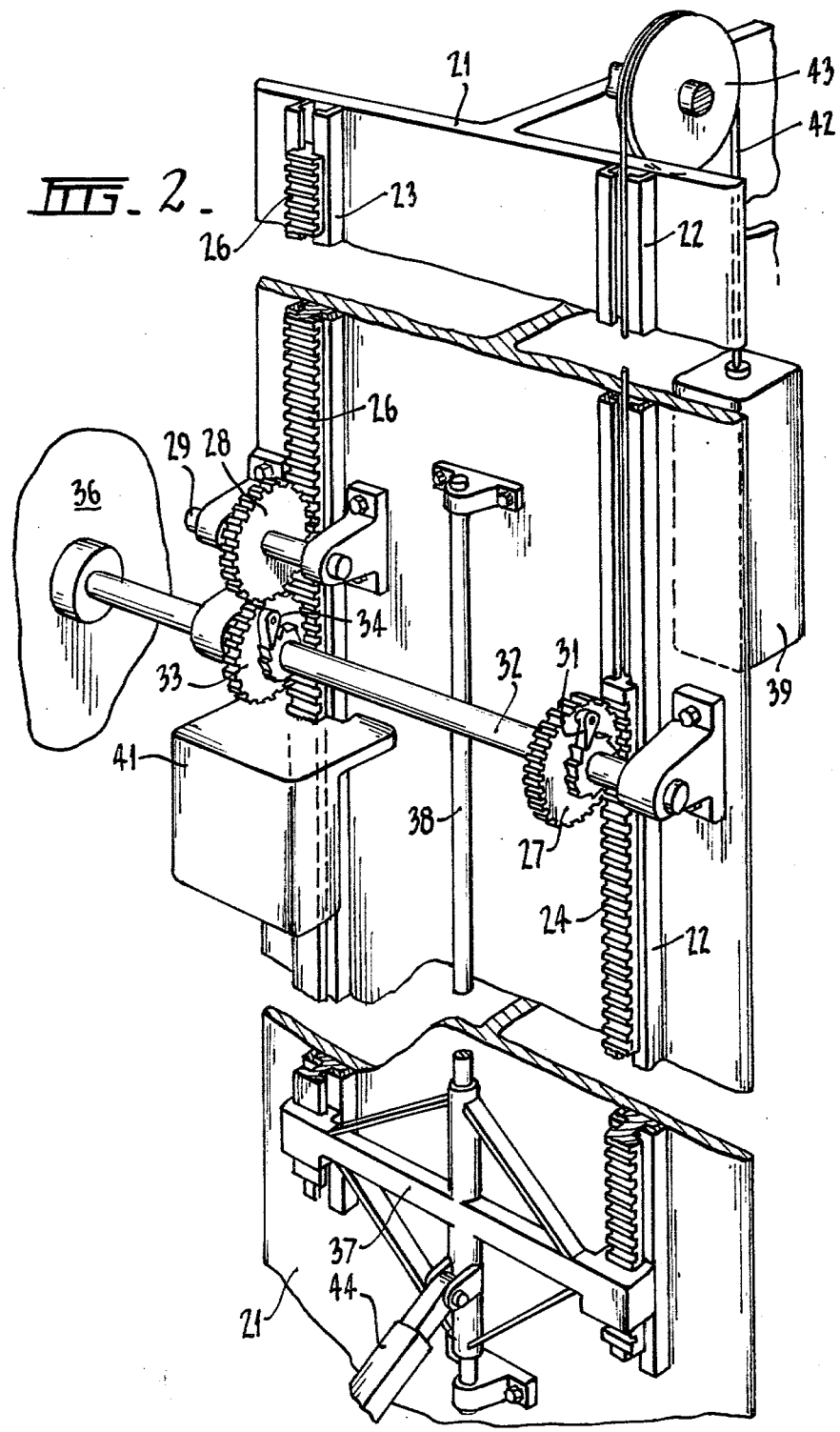
FIG. 2 is a diagramatic perspective view of the motion translation portion of the apparatus.

Referring to the drawings, there is provided power generating apparatus which comprises a float 12 constructed to be positioned on a body of water in a location so as to be subjected to wave motion. The location of the float 12 may be in an ocean adjacent the shore, or adjacent a substantially rigid structure over the water so that relative movement occurs between the float and its support due to wave motion.

Preferably, the float 12 is of substantially rectangular or trapezoid shape with an upwardly inclined forward edge portion which extends towards the direction of advance of the prevailing wave motion. The optimum shape, size and weight of the float may be experimentally determined to ensure maximum degree of movement of the float in response to wave movement.

The float 12 is mounted on one end of a support structure 14 pivoted at its other end on a pivot support 16 which is immovably fixed to a base mounted either on shore or on a relatively fixed rigid structure. For the purposes of this specification the invention will be described with the apparatus located on land and the float in sea water at a location where wave motion is substantially constant.

The wave motion acts on the float 12 to cause vertical movement thereof which results in arcuate movement of the support 14 about the pivot 16.

A beam-like structure 17 extends rearwardly of the pivot support 16 and is adjustably secured to the forwardly extending support structure 14 by means of rigid lugs 18 and spacer bars 19, shown diagrammatically in FIG. 1. With this arrangement, at any particular time, the optimum position of the float 12 in relation to the pivot 16 and the power generating apparatus may be selected.

The power generating apparatus which is operated by the vertical movement of the float comprises a vertical elongate support structure 21 immovably fixed in position. The structure 21 carries vertically extending guideways 22 and 23 guiding and supporting a pair of spaced gear racks 24 and 26 which are adapted to move vertically in the respective guideways 22 and 23. Each gear rack 24 and 26 is engaged by a gear wheel 27 and 28, mounted for rotation on shafts 32 and 29 on movement of the respective racks. The gear wheel 27 is connected through a ratchet mechanism 31 to the output shaft 32, and gear wheel 28 drives a second gear 33 which is connected through a second ratchet mechanism 34 to the output shaft 32. A flywheel 36 mounted on the output shaft 32 drives a generator (not shown) for generation of electrical power on rotation of the fly wheel 36.

Each ratchet mechanism 31 and 34 is arranged so that the movement of the respective racks 24 and 26 in opposite directions will rotate the flywheel 36 and reverse movements of the respective racks will result in slip of the ratchet mechanism. In other words, movement of the rack 24 vertically upwards will cause a driving motion to be transmitted to the flywheel 36 and vertical movement downwards of the other rack 26 will also drive the flywheel 36 in the same direction.

Each rack 24 and 26 is moved vertically on its associated guideway by means of a cross-arm 37, which itself is guided for movement parallel to the gear rack guideways by a suitable guide post 38. The cross-arm 37 is provided with releasable connecting means which are known per se and not illustrated in detail comprising spring biased wedges, ball detents, ball and ramp wedging means or other suitable releasable connecting means which enables the cross-arm 37 to grip and raise the gear rack 26 when the cross-arm is moved vertically upwards and to release that rack 26 and grip and move the other rack 24 downwards when the cross-arm 37 is moved vertically downwards.

It will therefore be seen that the arrangement of the cross-arm and the racks is such that reciprocating vertical movement of the cross-arm moves one rack to an elevated position and moves the other rack to a lowered position on the column.

Each gear rack 24 and 26 is connected to a driving mass 39 and 41, the gear rack 26 which is raised by the cross-arm 37 to the elevated position being directly connected to the mass 41 so that the mass tends to move that rack downwardly, and the other gear rack 24 being connected to the mass 39 via a cord or steel wire 42 passing from the top of the gear rack 24 over a pulley 43 mounted on the top of the support structure.

In operation of the apparatus, the cross-arm 37 is connected to the free end of the beam-like structure 17 by means of a connecting arm 44.

As the float 12 is moved vertically by action of waves acting upon it, the free end of the rearwardly extending beam-like structure 17 moves vertically a distance determined by the vertical distance moved by the float 12 and the ratio of the distance between the free end of the structure 17 and the pivot support 16 and the distance between the pivot support 16 and the float 12.

Vertical movement of the end of the structure 17 is transmitted to the cross-arm 37 by the connecting arm 44 so that the cross-arm is also moved vertically along its guide post 38.

Each time the cross-arm 37 is elevated the releasable connecting means engages with the gear rack 26 and moves that rack vertically. At this time the connecting means is automatically released from connection with the other gear rack 24 so the cross-arm 37 simply slides along that rack without imparting a vertical motion thereto.

As the cross-arm 37 begins to descend in response to the float 12 being raised by wave motion, the releasable connecting means engages the cross-arm 37 to the gear rack 24 to move that rack vertically downwards, thus raising the mass 39. At this time, the gear rack 26 is released from connection with the cross-arm 37 and is able to descend along its guideway under the action of the driving mass 41.

Therefore, the operation of the cross-arm 37 is alternately moving one or other gear racks to their uppermost position. When the gear racks are released from connection with the cross-arm 37 the masses act to move the respective racks thereby rotating the associated gear wheels and the fly wheel 36.

As previously stated, the fly wheel 36 is connected to an electrical generating system (not shown) to generate electricity as a result of the downwardly moving masses. The vertical movement of the waves acting on the floats 12 is thereby converted into electrical energy.

The structure of this invention ensures that the fly wheel 36 is not directly driven by motion from the float but is driven by the action of the falling masses associated with each of the moveable racks.

The structure of the invention may be mounted adjacent the shore or, alternatively, may be mounted on a platform erected some distance from the shore in order to take advantage of somewhat larger waves developed in offshore locations. Power from the electrical generators may then be transmitted vai undersea cables.

It will also be appreciated that a plurality of mechanisms in accordance with the invention may be located close together (or spread over some distance), each generating system operating independently and feeding power into a common electrical grid.

I claim:

1. Apparatus for generating electrical power utilizing the motion of waves on an open body of water comprising:
   (a) an elongate support structure means extending vertically upwards from a base relatively fixed with respect to said body of water,
   (b) guide means on said support structure means for at least two vertically moveable gear racks and a vertically moveable cross-arm engaged with each rack,
   (c) motion transmitting means on the cross-arm to move a first one of said gear racks during upward movement of the cross-arm and to move a second of said gear racks during downward movement of the cross-arm,
   (d) at least one gear wheel engaged with each gear rack, each gear wheel drivingly connected to an output shaft through one-way motion transmitting means whereby the motion of each gear rack in one direction only drivingly rotates said output shaft, (e) a first driving mass fixed to said first one of said gear racks to drive the gear rack downward under the action of gravity, (f) a second driving mass secured by cable means passing around pulley means on the support structure means to said second of said gear racks to drive the said second gear rack upwardly under the action of gravitational forces on said second mass, (g) float means on said body of water and horizontally spaced from the support structure means, said float means having a shape and configuration whereby the wave motion causes the float means to move vertically relative to said base, (h) support means for said float means pivotally mounted to a pivot support means fixed relative to said base and between said float and said support structure means, (i) beam means pivotally mounted at one end to said pivot support means and extending towards said support structure means, said beam means being adjustably secured to said support means for movement therewith in the vertical plane, and (j) a connecting arm pivoted at one end to the free end of said beam means and extending generally, upwardly therefrom to said cross-arm, whereby vertical movement of said float means reciprocatingly drives said cross-arm vertically on its associated guide means.

2. Apparatus according to claim 1 wherein said pivot support means is positioned approximately midway between the float and the support structure means.

3. Apparatus according to claim 1 wherein the means adjustably securing the beam means to the float support means includes means to permit variations in the angle of inclination of the support means relative to the beam means.

4. Apparatus according to claim 1 wherein each said one-way motion transmitting means comprises a drive wheel fixed to the output shaft and a pawl engaging teeth on said drive wheel.

* * * * *